US010232907B2

(12) United States Patent
Douglas et al.

(10) Patent No.: US 10,232,907 B2
(45) Date of Patent: Mar. 19, 2019

(54) BICYCLE

(71) Applicant: SWISSFLEET SERVICES GMBH, Zürich (CH)

(72) Inventors: Philip Douglas, Maschwanden (CH); Tobias Wülser, Effretikon (CH); Patrik Stieger, Zürich (CH); Frank Loacker, Pfungen (CH)

(73) Assignee: SWISSFLEET SERVICES GMBH, Zürich (CH)

( * ) Notice: Subject to any disclaimer, the term of this patent is extended or adjusted under 35 U.S.C. 154(b) by 0 days.

(21) Appl. No.: 15/303,348

(22) PCT Filed: Apr. 10, 2015

(86) PCT No.: PCT/EP2015/057885
§ 371 (c)(1),
(2) Date: Oct. 11, 2016

(87) PCT Pub. No.: WO2015/155352
PCT Pub. Date: Oct. 15, 2015

(65) Prior Publication Data
US 2017/0036735 A1    Feb. 9, 2017

(30) Foreign Application Priority Data

Apr. 11, 2014 (CH) .................................... 563/14

(51) Int. Cl.
| | |
|---|---|
| *B62K 3/06* | (2006.01) |
| *B62M 6/80* | (2010.01) |
| *B62K 19/08* | (2006.01) |
| *B62K 19/30* | (2006.01) |
| *B62K 19/48* | (2006.01) |
| *B62K 25/02* | (2006.01) |
| *B62M 6/55* | (2010.01) |
| *B62K 3/10* | (2006.01) |

(Continued)

(52) U.S. Cl.
CPC ................ *B62M 6/80* (2013.01); *B62H 1/02* (2013.01); *B62J 99/00* (2013.01); *B62K 3/02* (2013.01);

(Continued)

(58) Field of Classification Search
CPC ........ B62K 19/08; B62K 19/30; B62K 19/48; B62K 21/12; B62K 25/02; B62M 6/55; B62J 2099/004
See application file for complete search history.

(56) References Cited

U.S. PATENT DOCUMENTS 6,152,251 A * 11/2000 Nagai .................... B62K 11/04
                                                        180/206.4
6,695,335 B1 * 2/2004 Gaastra ...................... B62J 1/08
                                                        280/220

(Continued)

FOREIGN PATENT DOCUMENTS

| | | |
|---|---|---|
| DE | 296 18 907 U1 | 3/1997 |
| DE | 10 2011 052 270 A1 | 1/2013 |

(Continued)

*Primary Examiner* — Kevin Hurley
*Assistant Examiner* — Marlon A Arce
(74) *Attorney, Agent, or Firm* — Pauley Erickson & Kottis

(57) ABSTRACT

The invention relates to a bicycle (100) having a frame structure (200) that comprises a swingarm structure (225) including a first substantially U-shaped sheet metal part for holding a wheel (103), the frame structure further comprising a frame bridge (219) consisting of a second substantially U-shaped sheet metal part. The first U-shaped sheet metal part is bent substantially in a first bending plane (P) to form a first U-shape, and the second U-shaped sheet metal part is bent in a second bending plane (Q) to form substantially a second U-shape. The first bending plane extends substantially perpendicular to the second bending plane.

19 Claims, 7 Drawing Sheets

(51) Int. Cl.
  *B62H 1/02* (2006.01)
  *B62J 99/00* (2009.01)
  *B62K 3/02* (2006.01)
  *B62K 21/12* (2006.01)
  *B62M 6/40* (2010.01)

(52) U.S. Cl.
  CPC .................. *B62K 3/06* (2013.01); *B62K 3/10* (2013.01); *B62K 19/08* (2013.01); *B62K 19/30* (2013.01); *B62K 19/48* (2013.01); *B62K 21/12* (2013.01); *B62K 25/02* (2013.01); *B62M 6/55* (2013.01); *B62J 2099/004* (2013.01); *B62K 2204/00* (2013.01); *B62K 2700/04* (2013.01); *B62M 6/40* (2013.01)

(56) References Cited

U.S. PATENT DOCUMENTS

| | | | | |
|---|---|---|---|---|
| 7,055,842 B1* | 6/2006 | Lin | .................. | B62K 15/008 280/278 |
| 7,080,848 B2* | 7/2006 | Hara | .................. | B62K 19/32 280/279 |
| 7,104,562 B2* | 9/2006 | Schmider | .................. | B62K 25/30 280/284 |
| 7,168,726 B2* | 1/2007 | Klein | .................. | B62K 25/04 280/284 |
| 8,272,659 B2* | 9/2012 | Meredith | .................. | B62K 19/08 280/288.4 |
| 2005/0023061 A1* | 2/2005 | Noble | .................. | B62K 11/00 180/219 |
| 2008/0210203 A1* | 9/2008 | Sugiyama | .................. | B62J 37/00 123/509 |
| 2010/0295264 A1* | 11/2010 | Denais | .................. | B60C 7/10 280/260 |

FOREIGN PATENT DOCUMENTS

| | | |
|---|---|---|
| DE | 10 2011 053 733 A1 | 3/2013 |
| EP | 0 890 504 A1 | 1/1999 |
| EP | 1 188 659 A2 | 3/2002 |
| EP | 2 230 164 A1 | 9/2010 |
| WO | WO 2013/117643 | 8/2013 |

\* cited by examiner

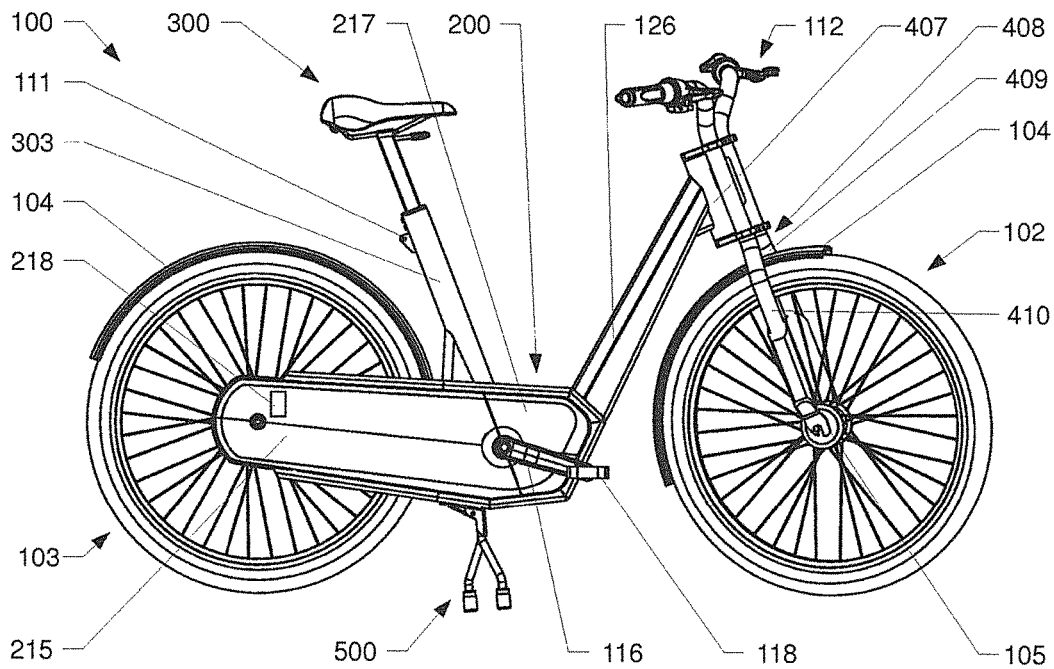
Fig. 1
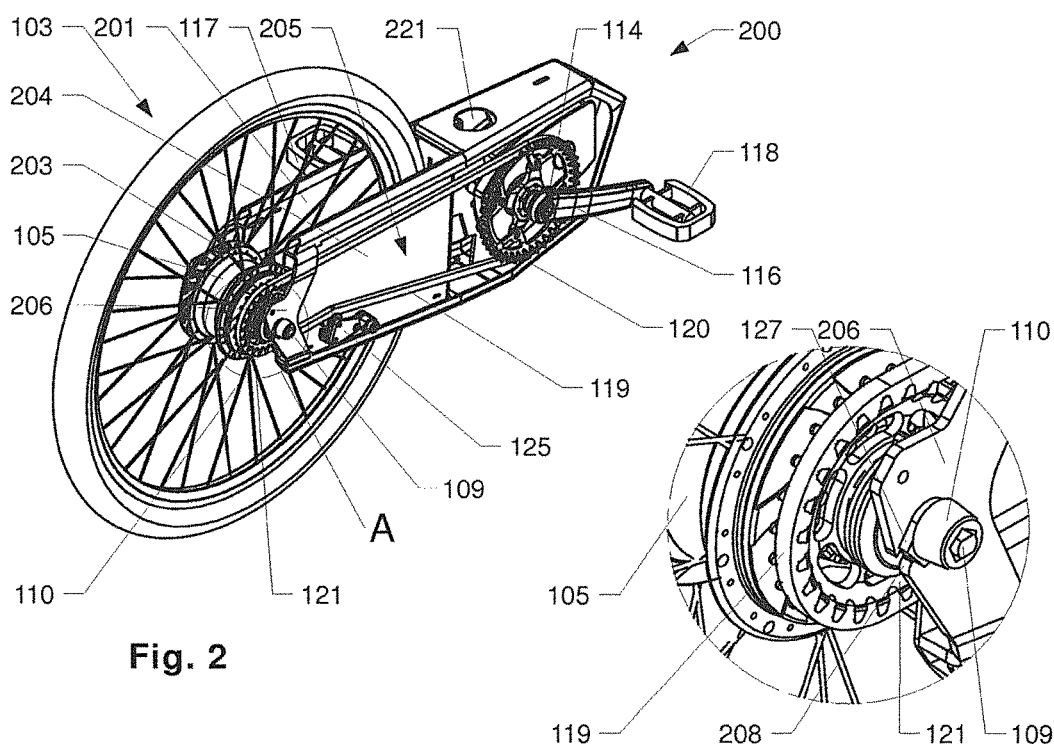
Fig. 2
Fig. 3

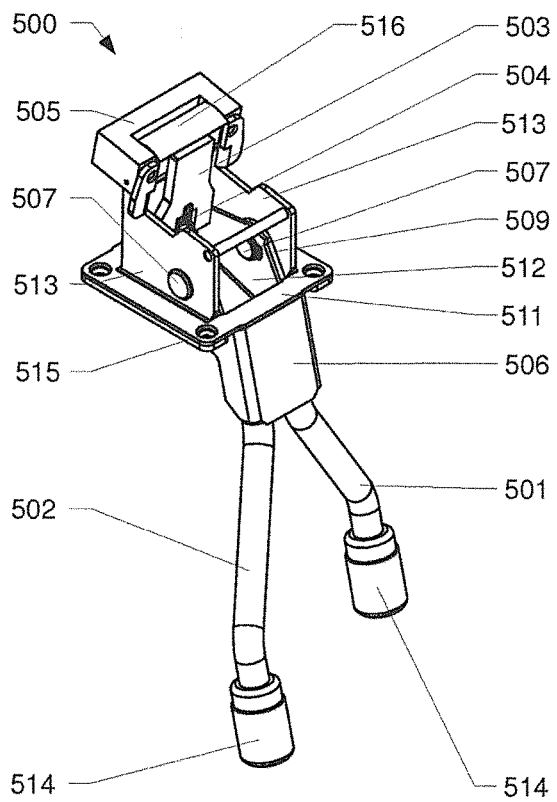
Fig. 8
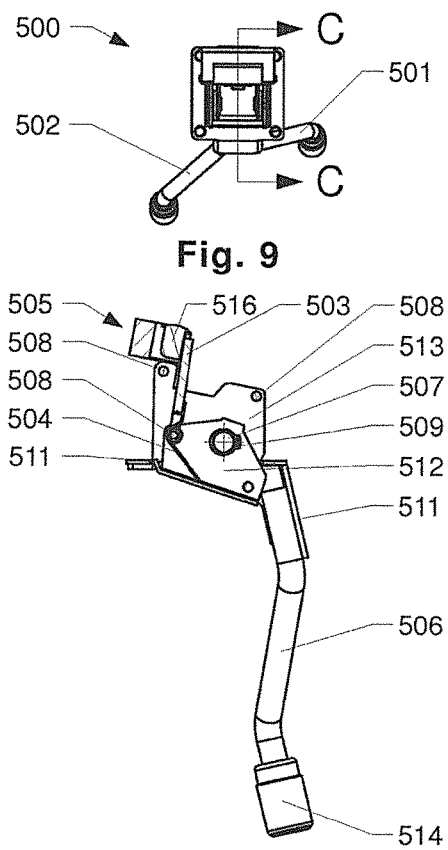
Fig. 9
Fig. 10
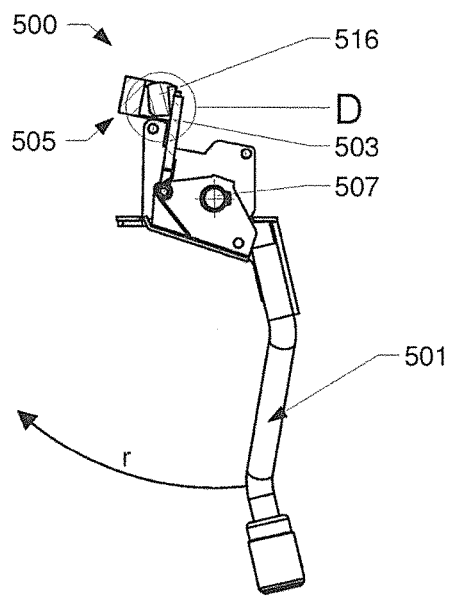
Fig. 11
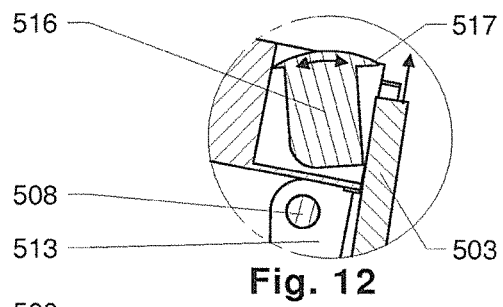
Fig. 12
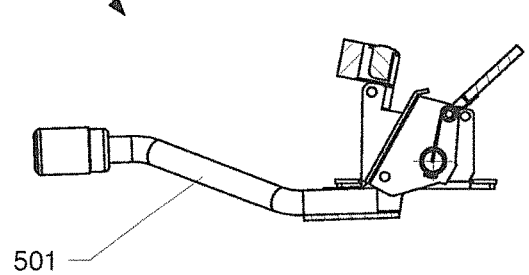
Fig. 13

BICYCLE

BACKGROUND OF THE INVENTION

Field of the Invention

The present invention relates to a bicycle with an electric drive, as well as to a frame structure for the same.

Discussion of Related Art

WO 2013/117643 of the same applicant was published for the first time in 2013 and discloses a drive for bicycles. It comprises a central housing, on which lateral rockers for supporting a wheel may be positioned. The central housing may house a motor, a gear and/or further components.

EP 2 230 164 by Thomus Veloshop has been published for the first time in 2010 and discloses a bicycle frame, in which a battery unit, which is adapted for an auxiliary drive, may be housed in the lower tube. The lower tube is provided, to this end, with a closable opening, through which a battery unit may be readily introduced into or removed from the tube segment. In the bicycle of said publication, the drive motor is integrated in the rear wheel.

EP 1 188 659 by Honda Motor Co. Ltd., has been published for the first time in 2002 and discloses a dismountable bicycle with an auxiliary drive. The hub of the rear wheel is attached on both sides to a two-part rear portion of the frame structure. These two parts are connected to each other by means of screws. The rear part of the frame structure is removably connected to the anterior frame structure by means of a sort of hinge. The saddle bar is directly attached to the rear part of the frame structure by means of clamping, wherein no conventional saddle bar is provided. The battery unit is attached between both parts of the rear frame structure, whereas the other components of the drive are arranged underneath the same.

SUMMARY OF THE INVENTION

The object of the invention is to provide a bicycle, which is suitable for an electric drive, as well as a frame structure for the same.

In one aspect of the invention, a frame structure (frame box) is provided, which has a particularly robust, torsion-resistant but nonetheless light construction. Moreover, the frame structure is provided with a relatively simple construction, with low production costs. A further advantage lies in the fact that the frame structure is suitable for different vehicles.

In one aspect of the invention the drive components and the energy supply are arranged inside the frame structure and therefore form a compact unit with a low center of gravity. The frame structure protects the components from external agents. Since the frame structure is at least partially formed of thermal conductive material, it may also operate as a cooling body.

Fields where the invention may be used are robust velocipedes for rent with and without an electric drive, for example, bicycles for transporting loads, bicycles with more than two wheels (tricycles), etc. The frame structure according to the invention may also be adapted for different applications. It is possible, for example, to use the frame structure in lightweight vehicles, which are particularly suitable for short range transport. It is also possible to construct vehicles with four or more wheels.

In an embodiment, the frame structure is provided with two substantially U-shaped sheet metal parts. A first area comprises a swingarm structure with two rockers, which are connected to each other frontally by a web (shoulder). The rockers may for example be formed by a bent U-shaped metal sheet, which forms a wheel compartment for partially housing and supporting a wheel. A second area comprises a frame bridge made of substantially U-shaped metal sheet, which encloses a relatively large volume, therefore forming a housing for a drive (drive box), in which, if necessary, the components for transmitting a driving torque and other components, too, such as a controller, may be provided, for example. In order to increase the stability, the sheet edges of the swingarm structure and the frame bridge may be at least partially folded.

As an alternative, or additionally, the drive box may be used for housing an internal bearing (pedal bearing) for a pedal bearing axle and a chain ring or a pulley. Similarly, it is possible that such a drive box houses an electric drive or another type of motor.

In a variant of the frame structure the leg ends of the U-shape of the frame bridge are solidly mechanically connected to the shoulder of the U-shape of the swingarm structure, so that the bending axles of the swingarm structure and the frame bridge are substantially perpendicular to each other. If necessary, specially formed brackets may be arranged on the leg ends of the swingarm structure, for supporting a wheel or a wheel hub. These brackets allow an encapsulated arrangement of the drive without the need for dividing a possible drive chain. Furthermore, in this way, a drive belt may be provided.

A further advantage of the frame structure, with respect to frame structures known in the state of the art, is that the geometry of the swingarm structure does not directly depend on the geometry of the drive box. In this way, by using only one type of swingarm structure, it is possible to construct different types of frame structures for different vehicles, by means of differently shaped frame bridges.

According to the invention, a bicycle with a frame structure may be provided with a swingarm structure made of a first substantially U-shaped metal sheet part for housing a wheel, as well as a frame bridge provided by a second substantially U-shaped metal sheet part. It is envisaged that the first U-shaped metal sheet part is substantially bent in a first bending plane to form a first U-shape, and the second U-shaped metal sheet part is bent in a second bending plane to form a second U-shape. The first bending plane according to the invention is substantially perpendicularly arranged with respect to the second bending plane, as explained in the following. The first bending plane may be considered a plane, which is substantially perpendicular to the bending axis or bending axes of the first substantially U-shaped metal sheet part. The second bending plane may be considered a plane, which is substantially perpendicular to the bending axis or bending axes of the second substantially U-shaped metal sheet part. The first U-shaped metal sheet part and the second U-shaped metal sheet part are provided with a first leg with a first leg end and a second leg with a second leg end, respectively, as well as a shoulder area. According to the invention, the first and the second leg end of the second U-shaped metal sheet part may be mechanically connected to the shoulder area of the first U-shaped metal sheet part.

The frame bridge may comprise a supporting structure, which extends between both legs of the frame bridge and operatively connect these to each other and may also be used for supporting a drive component. The supporting structure may be provided with at least a cavity for housing a drive component. The supporting structure may be a plate structure, for example. Such a plate structure may comprise one or more plates. In this way, the supporting structure may, if necessary, be readily mechanically reinforced, at least partially, as explained in the following. An improvement of the structural mechanical properties may be achieved, if at least one edge of the swingarm structure and/or at least one edge of the frame bridge is at least partially inwardly and/or outwardly folded. The frame bridge may have openings for attaching other frame parts and/or a stand and/or may be provided as a cooling air inlet.

The first and the second end of the swingarm structure may be provided, respectively, with a housing means for supporting a wheel axle. These bracket-shaped preferably protrude from the rockers, may therefore be considered as brackets. The housing means may also comprise drop-outs.

A particularly simple mounting of a rear wheel, or a rapid replacement of the same, may be obtained, if the housing means are provided with mounting elements, which are adjustable with respect to the rockers. In a variant of such embodiments, the mounting means may be adjustably provided on brackets, which are fixed to the rockers, as explained in the following. In a variant, it is possible to use adjustment screws to change the orientation (for example the distance) of the mounting means with respect to the pedal bearing shaft. The adjustment screws may be slidably positioned, to this end, in oblong openings. In this way, the distance between a wheel axle supported by the housing means and the pedal bearing shaft may be increased or reduced, so that the tension of a drive chain or drive belt may adjusted, for example. In this way, it is possible to possibly omit an additional chain or belt tensioning device. The mounting elements may be provided with drop-outs.

In a variant of the frame structure, the mounting elements may be separated from the rockers, so that it may be possible to use different mounting elements for different types of rear wheels, for example. In such a variant it is therefore possible to arrange interfaces on the brackets for receiving different mounting elements.

In principle, a frame structure according to the invention may be produced in a single metal sheet piece. In most cases it is however advantageous, if the frame structure is composed of different parts. The individual parts may be preferably made of aluminum or aluminum alloys or steel. Hybrid constructions with different materials for different parts of a frame structure according to the invention may also be considered.

In a frame structure according to the invention it is possible to use different interchangeable lateral outer covers, and therefore isolate the drive box from the outside. In this way, the drive components contained inside the drive box may be protected against vandalism, humidity and dust. If the metal sheet edges of the swingarm structures are folded, it is possible through such external covers for both rockers, to define respective compartments joined with the drive box and encapsulate the same from the outside. These are suitable for housing a battery, for example, or a drive train or a drive belt or other elements. The covers may be used for cooling the inner elements.

The outer covers may be provided in one or more parts and may be made of metal, for example, or transparent or opaque extruded plastic or fiber-reinforced plastic material. The covers may be part of the supporting structure. At the rear end of the rockers, additional covering elements (hinge elements, cover metal sheets, for example) may be arranged, which have to provide additional protection against vandalism, for example, for the brake system (brake disc). These cover elements may also be elements for a specific deviation of air flowing around the bicycle, and therefore for example for cooling the braking system during operation.

The frame structure may be provided with additional fixing points for attaching additional components. For example, in the area of the leg ends of the wing structure, attachment points for a luggage support may be provided.

By using materials (aluminum, for example) with a good thermal conductivity, the frame structure may also be used for discharging heat, which is produced by components inside the frame structure, such as the drive motor, a battery, a component of the drive controller or a brake. To this end, the frame structure may, if necessary, be provided with additional elements for increasing convection, such as cooling ribs or cooling channels.

Depending on the embodiment and the application area, the individual parts of the frame structure are glued, welded, riveted and/or screwed to each other.

By using metal sheet parts, contrary to the frame structures of the state of the art which are composed of tubes, the frame structures according to the invention may be easily welded by robots. In this way, frame structures may be produced with high precision and a high reproducibility in a very cost effective way.

An advantage of the frame structure according to the invention is the fact that massive components, such as the battery, may be positioned at a relatively short distance from the road surface. In this way, the general center of mass of a bicycle built on the frame structure according to the invention lies at a relatively short distance from the road. Such a bicycle has a good maneuverability and a particularly stable position, without easily tipping over. Corresponding bicycles also have good driving characteristics.

A variant of the inventions envisages the use of an active cooling system for batteries and/or motor and/or brakes. This system may include a fan and/or a Peltier element and/or a cooling circuit. Such an active cooling system may ensure an improved cooling of battery, electronics and motor during driving and/or a charging cycle. Such a system may also include cooling channels, which extend along the frame structure inside the same, and which allow a flow through the frame structure between one or multiple cooling air inlets and outlets. Such systems may in particular be used in hot climates.

In addition or as an alternative, according to the invention, systems for active heating of batteries or other components may also be provided inside a frame structure, in order to ensure optimal charging cycles of batteries during winter time or in cool climates. As an alternative to such active heating systems, or as a supporting means for the same, portions of the frame structure may also be provided with a thermal insulation.

As an alternative or as an addition, at least one of the two rockers of the frame structure may have a compartment, which may be opened, for example, for removing a cover or for opening a door. This allows, for example, the removal or replacement of batteries. Alternatively or additionally, in this way, access to an energy or data interface may be provided, for example. Such a folding mechanism may also be used for improved cooling of batteries, for example, when the bicycle is stationary. The locking and unlocking and the opening or closing may be manually or automatically performed.

In a further aspect of the invention a handlebar for a bicycle is provided, which is ideally suited for combination with the frame structure, although it may also be referred to a separate inventive concept. In such a handlebar, the handlebar tubes (fork arms) and the steering handles (handles) are connected to each other and therefore form a continuous inner channel. In this way, for example, electric conductors of controller and the light system and also the Bowden cables of the front and/or rear braking system may be, for the most part, be provided inside the handlebar, thereby being more protected against vandalism. In an embodiment of an inventive handlebar, this is substantially comprised of two structures, which are integrated in one tube, which are formed by bending and hydraulic round pressing.

A handlebar according to the invention may comprise a first and second fork tube, structurally separated from the same, and a first and second steering handle, wherein the first fork tube is structurally connected to the first steering handle and the second fork tube is structurally connected to the second steering handle. Preferably, inside the two fork tubes, a respective continuous opening extends into the steering handles, in which electric cables or braking cables (Bowden cables for example) may be arranged. On the fork tube electric contact poles may also be arranged, which may be used for example for charging batteries. A fork tube preferably includes a respective contact pole. The fork tubes may also be used as a mechanical docking means to a docking station.

In a further aspect of the invention a connection to a docking station is provided on the handlebar of a bicycle, by integrating a corresponding connection point in the same. To this end, for example, two electric contacts for charging the batteries (contact poles) may be separately provided in either one of handlebar tubes. In this way, for connecting to a docking station, two clamps arranged on the handlebar tubes may be used, for example, which ensure a mechanical connection and at the same time an electric connection with the contact poles.

In a variant of the invention, means for connection to a docking station are provided in the area of the bicycle's suspension. To this end, on one side or on both sides of the wheel axle contact elements may be arranged, which allow a mechanical and/or electric connection between the bicycle and a docking station. The contact elements may be provided by substantially cylindrical pins. The contact elements may be provided in such a way that they allow a mechanical and/or electric connection between the docking station and the bicycle. The electric connection may be provide by physical contact and/or by induction. A particularly fast recharging of energy accumulators (batteries) provided on the bicycle as well as a robust data exchange between docking station and bicycle may be obtained, if the charging current flows through electric contacts (sliding contacts, for example) and the data transmission is essentially contactless by induction. A bicycle provided with such contact elements allows a particularly vandal-proof coupling of bicycle with the docking station. This is particularly true when they are used in conjunction with a handlebar of above said type, since in this case the electric connections of contact elements are guided through the fork tubes, allowing a better protection against vandalism. As an alternative or addition, connection points for a docking station may also be arranged on the handlebar or on the frame structure.

A further aspect of the invention refers to a bicycle stand (stand) and may also be considered as a separate inventive concept. By using a frame structure which is essentially encapsulated with respect to the outside, such a bicycle stand may also easily incorporate the function of a theft protection. It is foreseen that such a bicycle stand comprises one or preferably two supports, which are automatically locked in the unfolded state. A bicycle which is positioned on the bicycle stand cannot move. According to the invention, the (mechanical) components, which inhibit the folding of the stand, are essentially arranged within the frame structure of the bicycle, and are protected against unwanted access. A possible mechanism may comprise a closure bolt, which prevents the folding of the bicycle stand through positive locking after the unfolding. To this end, the closure bolt prevents rotations of the stand around its bearing, by being locked by a holding element. Such a holding element may be part, for example, of an electric automatic door opener. This is known, for example, in home doors of multiparty housings. The unlocking of such door openers is generally obtained by applying an electric voltage. This can be activated, for example, by an electronic control unit, after identification of an authorized user of the bicycle. According to the invention it is in particular possible that such an identification/authorization is performed by use of an RFID system. Similarly it is possible to use purely mechanical systems for the unlocking, such as a conventional key-lock system. It is advantageous if the unlocking is acoustically and/or optically signaled to the user. The unfolding and/or folding of a stand may also be automatic, for example by means of an electric assistance drive.

According to the invention it is also envisaged that when the bicycle stand is unfolded, the electronics of the bicycle interrupt the energy supply to the drive motor, for example.

Such a stand for a bicycle is provided for example with a folded and an unfolded position. It also comprises a locking mechanism, which prevents a folding of the stand in at least one unfolded position and allows the unlocking. In order to protect such a mechanism from unauthorized access, it is arranged within the frame structure. The locking mechanism is preferably provided with means for the electromechanical unlocking. It may also be coupled to a drive control of the bicycle. The unlocking of the stand may be performed by means of RFID and/or a mechanical key and/or by inputting a numerical code and/or by biometric identification of a user.

A further aspect of the invention refers to a device for attaching a saddle to a bicycle (saddle attachment) and may also be considered as a separate concept of the invention. For a simple adjustment of saddle height it is envisaged to use a gas spring which is partially arranged within the saddle stay (saddle tube). Corresponding gas springs are known, for example, for height adjustment of office chairs. According to the invention it is advantageous, although not necessary, if the saddle stay is provided with a non-round cross-section. In particular saddle stays with an elliptical or polygonal cross-section are advantageous. On the saddle stay a sleeve corresponding with the cross-section of the saddle stay is provided. In this way, relative undesired rotations according to the invention between the saddle and the bicycle are prevented.

The characteristics of the various embodiments or variants described may be combined, if they are not mutually exclusive.

BRIEF DESCRIPTION OF THE DRAWINGS

The invention is explained in the following by means of examples, in connection with the drawing. In particular:

FIG. 1 shows a bicycle with a drive unit;

FIG. 2 shows a drive unit with a frame structure, viewed from rear upper-right;

FIG. 3 shows detail A of FIG. 2,

FIG. 8 shows a bicycle stand in a first view;
FIG. 9 shows a bicycle stand in a further view;
FIG. 10 shows section C-C of FIG. 9;
FIG. 11 shows a bicycle stand in a further view;
FIG. 12 shows detail D of FIG. 11;
FIG. 13 shows a bicycle stand in a further view.

DETAILED DESCRIPTION OF THE INVENTION

Figure 4:
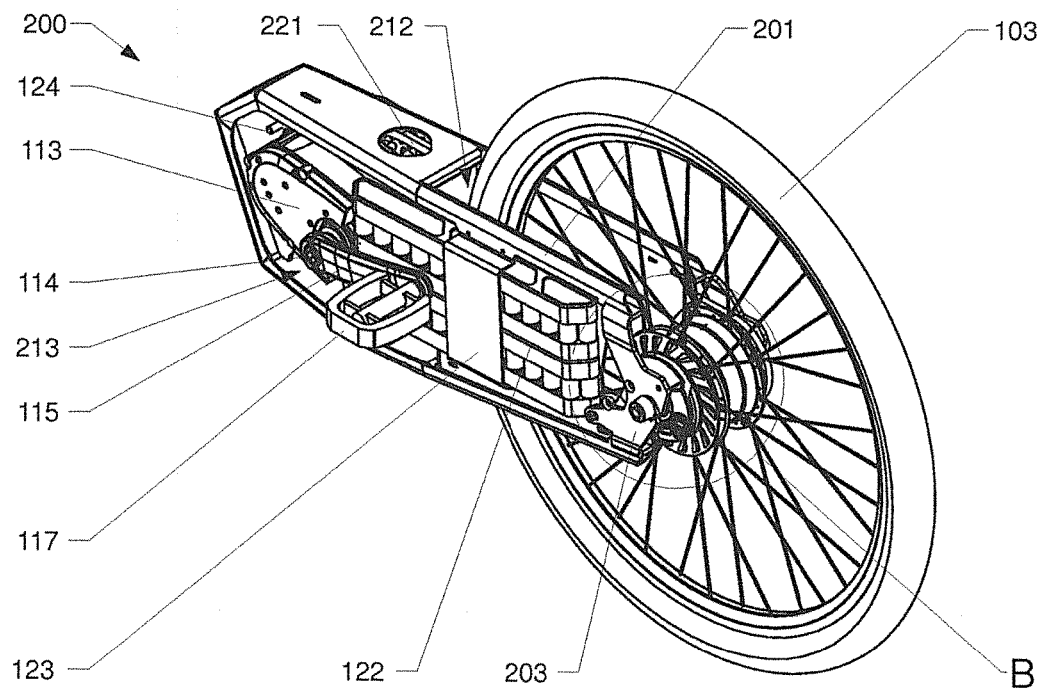
FIG. 4 shows a drive unit with a frame structure viewed from rear upper-left.

FIG. 1 shows a bicycle 100 with a possible frame structure 200 according to the invention. The bicycle 100 shown is provided with a front wheel 102 and a rear wheel 103. The rear wheel 103 is connected to the frame structure 200, which in turn is connected, through a connection support formed by a lower tube 126 and a steering tube 407, to a handlebar 112. The handlebar 112 is connected, through a fork 408, comprising a first fork leg 409 and a second fork leg 410 with the hub 105 of the front wheel 102. The bicycle 100 may be provided with a bicycle stand 500. The bicycle 100 is provided with a pedal crank drive with a first (115—not shown) and second pedal crank 116 and a first (117—not shown) and second pedal 118. The drive torque provided by the driver is transmitted through a drive unit to the rear wheel 103. In the bicycle shown the mechanism is encapsulated in the frame structure 200 and is covered on the sides by two front covers 217 and two rear covers 215. The covers may be provided with means for deflecting the air during driving, such as shown, through air guide elements 218, which guide the air flowing around the frame structure during driving, for example, to a braking system. A bicycle 100 with a frame structure 200 according to the invention may also be provided with a saddle 312, or multiple saddles. According to the invention, such covers may not necessary, or may also be provided in one or more pieces. The bicycle 100 shown may also be provided with further components known to the skilled in the art, such as protective metal sheets 104 or a luggage support, which may be provided on a corresponding fixing element 111.

As shown in FIG. 2, the transmission of a drive torque applied by the driver through the pedals 117, 118 and pedal cranks 115 (not shown), 116 to the pedal bearing shaft 114 may be transmitted according to the invention for example through a first belt pulley 120 and a toothed belt 119 to a second pulley 121 and from there to a wheel hub 105. For guiding and preloading the toothed belt 119, one or more belt tensioning devices 125 or guiding pulleys (not shown) may be used. The toothed belt 119, as shown in FIG. 2, may be arranged at least partially in the second rocker 204. Alternatively, it also may be partially arranged in the first rocker 201. The second rocker 204 may have a second (inner) compartment 205, in which, apart from the toothed belt 119, further elements may be provided. It is conceivable, that the wheel hub 105 has a hub gear, through which the torque applied by second belt pulley 121 is converted and transmitted to the rear wheel 103. The rear wheel 103, or the rear wheel hub 105 may be mounted on the frame structure 200 by means of fixing screws 109 and a fixing nut 110. To this end, it may be provided on the first rocker 201 with a first bracket 203 and on the second rocker 204 with a second bracket 206, which may house the fixing screws 109. A frame structure 200 according to the invention, as shown in FIG. 2, may also be provided with one or more openings 221, for example, for fixing a saddle tube (not shown).

As shown in FIG. 3, in a frame structure 200 according to the invention, the axle of a rear wheel may be supported in that fixing screws 109 disposed on hub 105 of rear wheel are inserted into a drop-out end 209 on second bracket 206 and are fixed by a fixing nut 110. The wheel axle may additionally be held by an axle sleeve 127, which is supported in drop-out end 209.

As shown in FIG. 4, a bicycle 100 according to the invention may also be provided with at least one electric auxiliary drive or motor 113, which is preferably arranged in a drive box 213 on the pedal bearing shaft 114. The energy storage for motor 113 may be provided by one or more battery packs 122, preferably inside the frame structure 200. A battery pack 122 may be solidly mounted inside the rocker 201, and may be connected to same, as shown, for example, by means of attachment means formed by a mounting bracket 123, or alternatively may be simply removed from the frame structure 200 for example by means of a folding mechanism. In the embodiment of FIG. 4, the battery packets 122 are provided in a first compartment 202 inside the first rocker 201. The frame structure 200 is also provided, in the area of the drive box 213 with enough space for further components, such as the electronics of the drive control 124.

Figure 5:
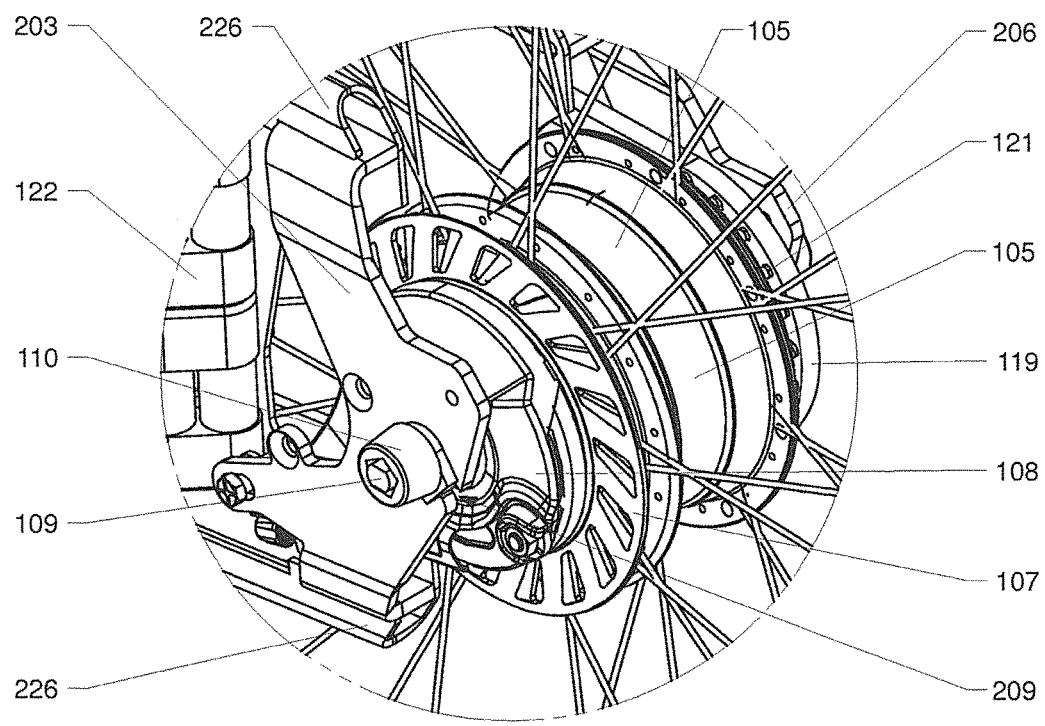
FIG. 5 shows detail B of FIG. 4.

As shown in FIG. 5, in a preferred embodiment of the invention, the first 203 and second bracket 206 are sized in a way that both a belt pulley 121, a wheel hub 105 with hub gears and a disk brake, o the roller brake type, for example, with a brake disk 107 and brake caliper 108, may be positioned between both the drop-out ends 209. Due to both brackets 203 and 206, such an arrangement is possible also with a relatively narrow frame structure 200, or wheel box 212. Brackets 203 and 206 may also be provided with additional elements, such as holes for fixing a brake caliper 108.

Figure 6:
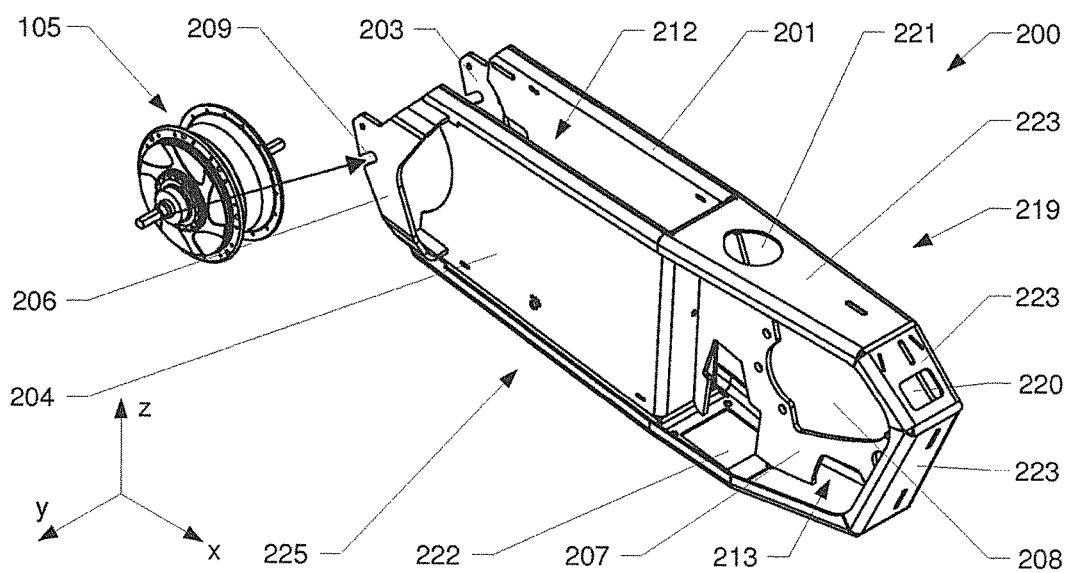
FIG. 6 shows a frame structure and a wheel hub in a first view.
Figure 7:
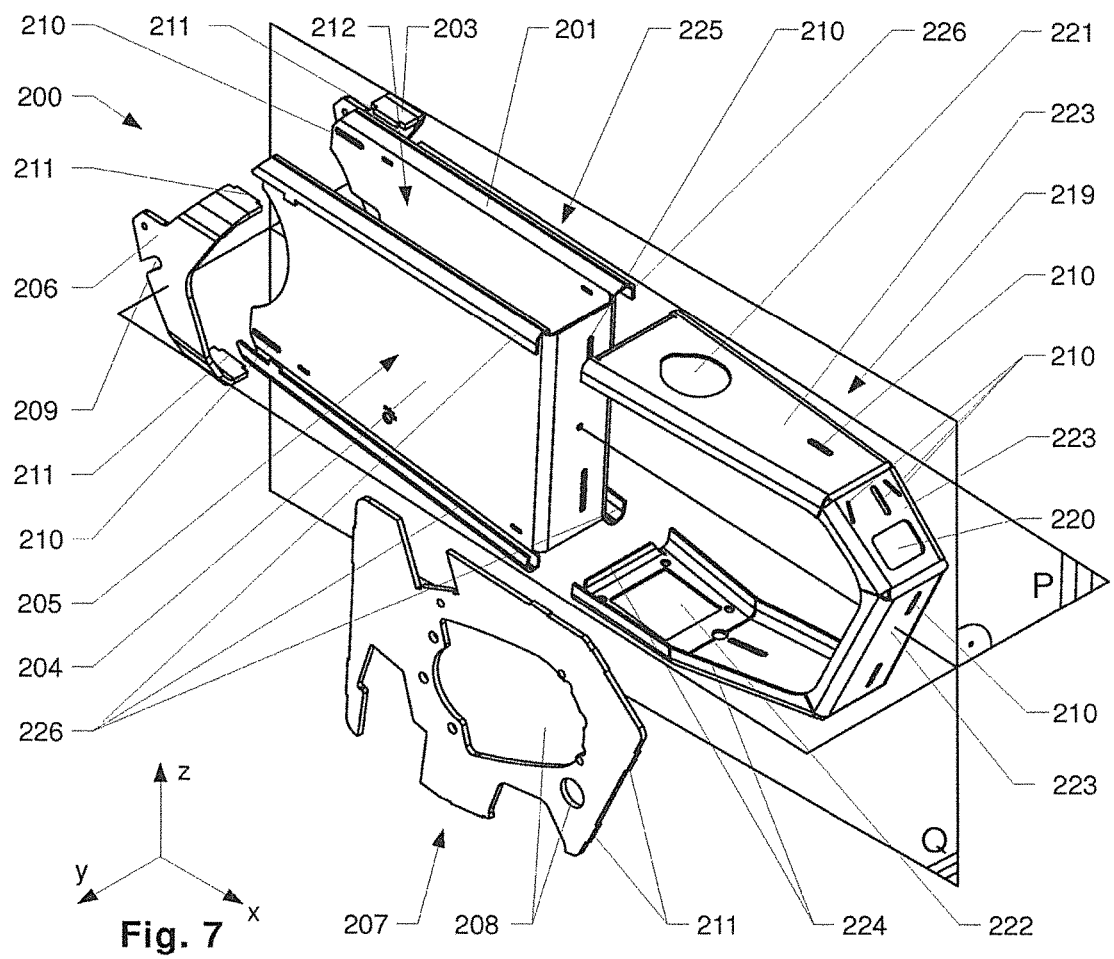
FIG. 7 shows an exploded view of a frame structure.
Figure 14:
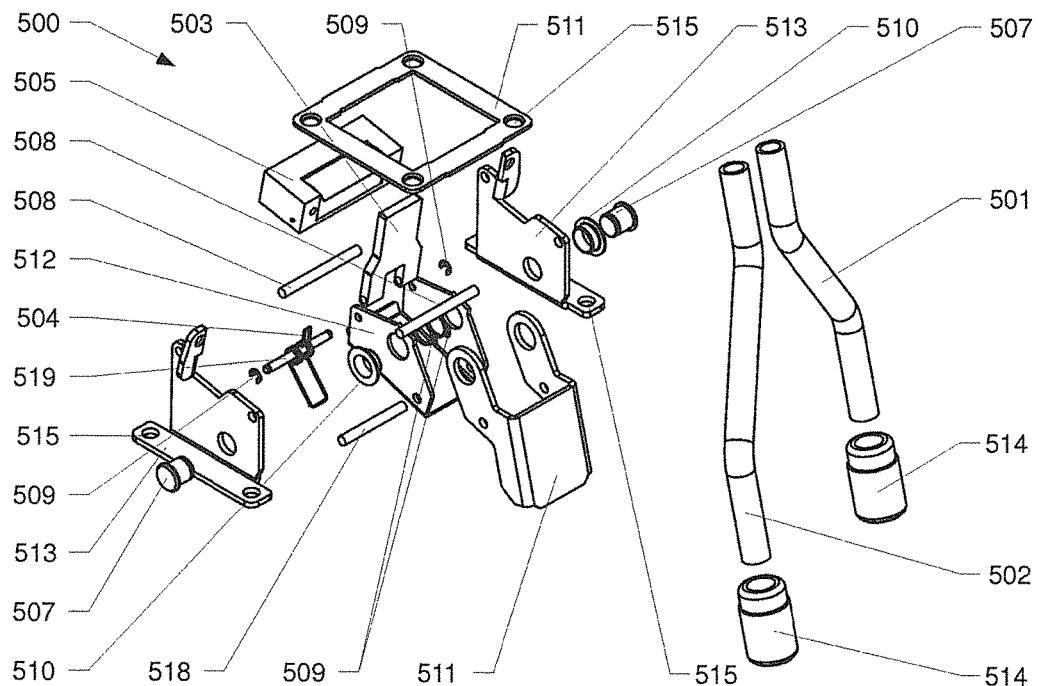
FIG. 14 shows an exploded view of a bicycle stand.

As shown in FIGS. 6 and 7, a frame structure 200 according to the invention may be comprised of relatively few metal sheet parts. The frame structure 200 shown in FIG. 6 is essentially comprised of five metal sheet parts, which are connected by means of welded connections, glued connections or other joining techniques, suitable for metal sheet connections. In the embodiment shown, a swingarm structure 225 is connected with a first 203 and second bracket 206 mechanically to a frame bridge 219. For a better connection, the single components may be provided with corresponding slots 210 and springs 211, which are used as positioning means as well as for increasing the connection resistance. The metal sheet parts may be relatively inexpensive to produce by punching, laser cutting and bending. The swingarm structure 225 is made of a first metal sheet part and has, in the view from above (Z direction) essentially a U-shape. This first metal sheet part is essentially bent (curved) in a first bending plane P to form a first U-shape.

As shown, in a swingarm structure, its rigidity may be enhanced by an upper and lower seam or folds 226. At the same time, such a folding of edges may be used for creating compartments 202 or 205 in both swingarms 201 and 204. The frame bridge 219 shown is comprised of a second metal sheet part and has an essentially U-shaped construction, in the side view (Y direction), and radially delimits, with shoulder of swingarm structure 225 a drive box 213. This second metal sheet part is essentially bent (curved) in a first bending plane Q to form a second U-shape. As schematically shown in FIG. 7, the frame bridge 219 and the swingarm structure 225 in the frame structure 200 shown are mutually arranged in such a way that the first bending plane P is essentially perpendicular to the second bending plane Q. As shown, a frame bridge 219 according to the invention may be provided with different openings, such as an opening 220 for connecting a lower tube (lower tube not shown), an opening 221 for connecting a saddle stay (saddle stay not shown) or an opening 222 for partial housing of a bicycle stand (bicycle stand not shown). At the same time, a frame bridge 219 according to the invention may have different attachment surfaces 223, which in the embodiment shown are planar, but may also be curved. For increasing the structural integrity of the frame bridge 219, this may have, as shown, preferably tabs or folded edges 224, which increase the bending and deforming resistance. In addition, in the drive box 213, as shown, a partition plate or slide plate 207 as a support structure may be arranged, which has different functions. It increases the structural stability of a frame structure 200 on one side, and it may be used as a spatial separation of the drive box 213 on the other side, and may for example separate a partial volume protected from humidity of a frame structure 200, in which for example electronic/electric components of drive are arranged, from a partial volume, which is only conditionally protected, in which the belt drive is positioned, for example. A supporting structure 207 may however be used also as a mounting means for a motor or other components, for example. To this end, it may be provided with corresponding cavities 208, if necessary.

In an encapsulated frame structure 200 according to the invention, an advantageous embodiment of a protected bicycle stand 500 may be used, as shown in FIGS. 8 to 14. A bicycle stand 500 according to the invention is also characterized by at least one unfolded and folded position. Such a bicycle stand 500 comprises a support part, which is formed by a first 501 and second support 502, and a mechanism which is provided inside a frame structure, for unfolding and fixing supports 501, 502. In the embodiment shown, the supports have at their lower ends support feet 514, which are made of an elastic material, such as rubber, for example. The supports are attached, at their other ends, to a support plate 506, by welding points, for example. The support plate 506 is connected, on both sides, by two bolts 507, in a rotatable articulated way to two stand supports 513. For a better support, sleeves 510 are also used. The stand supports 513 have holes 515, which are used for attaching to the frame structure 200, for example by means of screws or rivets. For improving such a connection, a kind of frame plate 511 may be used, which is also provided with holes 515. As shown in FIGS. 8 to 14, a bicycle stand according to the invention may have, in some embodiments, also a locking mechanism, which comprises an automatic door opener, which is solidly connected to both stand supports 513 on both sides. A cross bar 512 is also supported, like the stand support 513, in a rotatable articulated way on bolt 507 and is also connected with a connecting pin 518 to the stand support 513, so that between these bodies no relative rotations may take place. A locking bolt 503 is rotatably connected through an axle pin 519 with the cross bar 512 and, as shown in FIG. 10, in the unfolded position of bicycle stand 500, is pressed by a torsion spring 504 against the door opener 505. In this way, a folding of the stand is prevented by a locking element 517 which is positioned on the door opener latch 516 (see FIG. 12).

In order to fold the bicycle stand 500 in a closed position, a tension may be applied on the door opener 505, whereby a rotation of door opener latch 516 is allowed (see FIG. 12). In this way, the closure bolt 503 is no more blocked by the locking element 517 of the door opener latch 516 and a rotation r of supports 501, 502 around axis of bolts 507 is allowed, whereby the bicycle stand 500 may be moved into a folded position (see FIG. 13). Such a mechanism is allowed since the relatively simple locking mechanism is arranged inside the frame structure 200 and is therefore protected from direct access or manipulation. Due to the use of a conventional automatic door opener 505, it is also possible to use a reliable and relatively cost effective electromechanical locking system, which also provides the user in general with a notification of unlocking by emitting a buzzing sound. The axle pins 519 and bolts 507 of a bicycle stand according to the invention may be fixed by fixing rings 509, whereby in case of failure of mechanism, relatively simple parts of the same may be replaced. In order to detect the correct closure of stand, it may be provided with an end switch, which detects the contact between the closure bolt 503 and the door opener 505, or the door opener latch 516 or the locking element 517.

Figure 15:
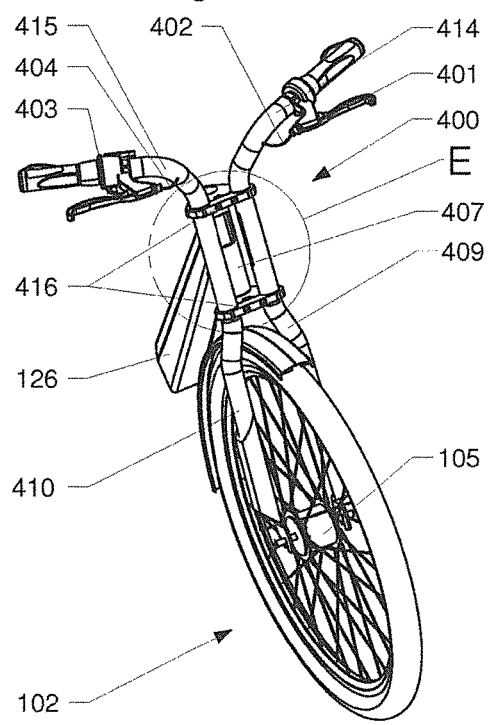
FIG. 15 shows a handlebar of a bicycle in a first view.
Figure 16:
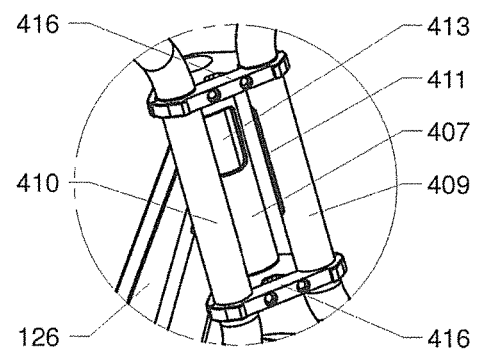
FIG. 16 shows detail E of FIG. 15.
Figure 17:
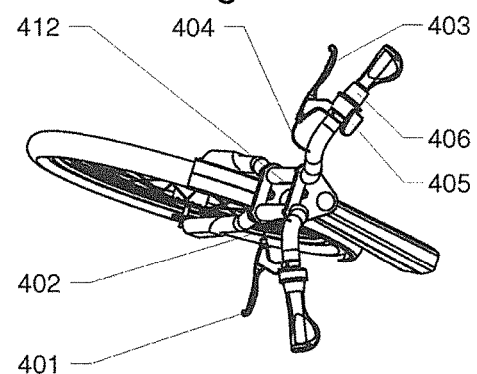
FIG. 17 shows a handlebar of a bicycle in a second view.

As shown in FIG. 15, a bicycle 100 according to the invention may be provided with a docking means 400 for connecting the bicycle 100 to a renting station, for example. To this end, the embodiment of FIGS. 15 to 17 of a bicycle 100 according to the invention is provide with a two-part bicycle fork 408. It comprises, in the embodiment of the invention, a first fork leg 409 as well as a second fork leg 410. Both fork legs 409, 410 are provided by round tubes, and extend from hub 105 of front wheel 102 through the area of the steering tube 407 into the first 414 and second steering bar 415. Both round tubes are provided, in the area of steering tubes 414, 415, with a smaller (tapered) diameter with respect to the area of the hub 105. Such a tapering may be preferably provided by round pressing. The use of such continuous tubular fork legs allows, among other things, a protected arrangement of brake cables 402, 404 inside the fork legs 408, 409, whereby vandalism may be relatively prevented. Brake cables 402, 404 may be introduced, relatively directly, at first 401 and second brake grip 403 into fork legs 409 or 410. The same holds for connections to gear grip 406 and a console 405 being part of the gear shift or electronic control of bicycle 100. In the area of steering tube 407, both fork legs 409, 410 are held by an upper and lower fork bridge 416, as shown, among other things, in FIG. 16. Fork legs 409 and 410 may be preferably provided, in the area of docking means 400 with a first 411 and second contact pole 412, through which the batteries 122 may be charged, for example.

Figure 18:
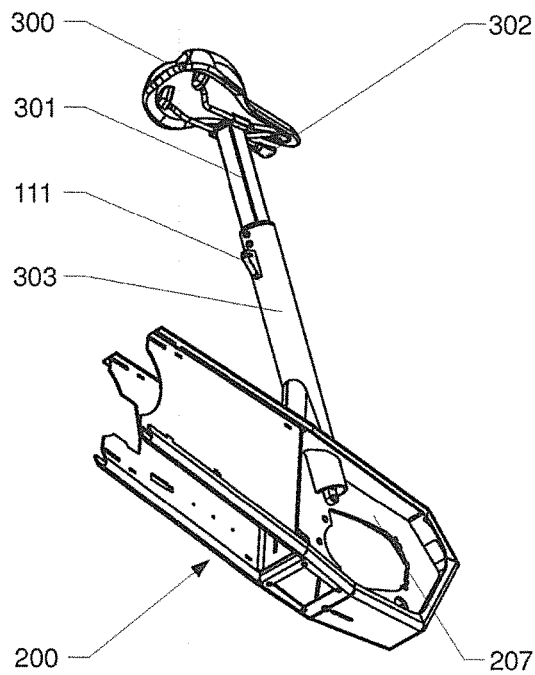
FIG. 18 shows a saddle in a first view.
Figure 19:
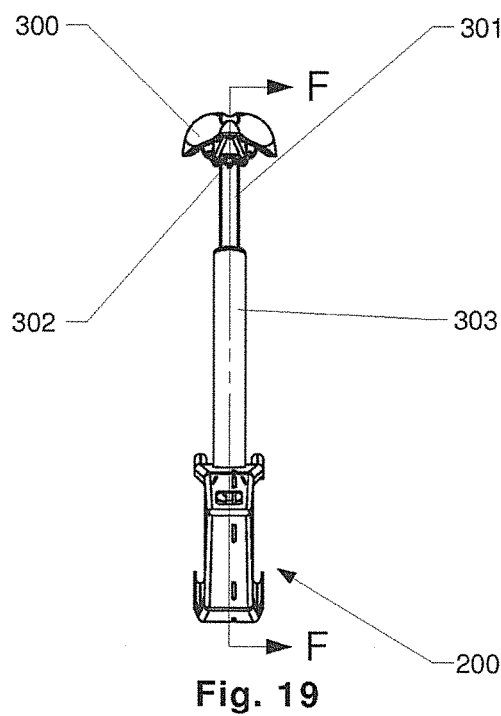
FIG. 19 shows a saddle in a second view.
Figure 20:
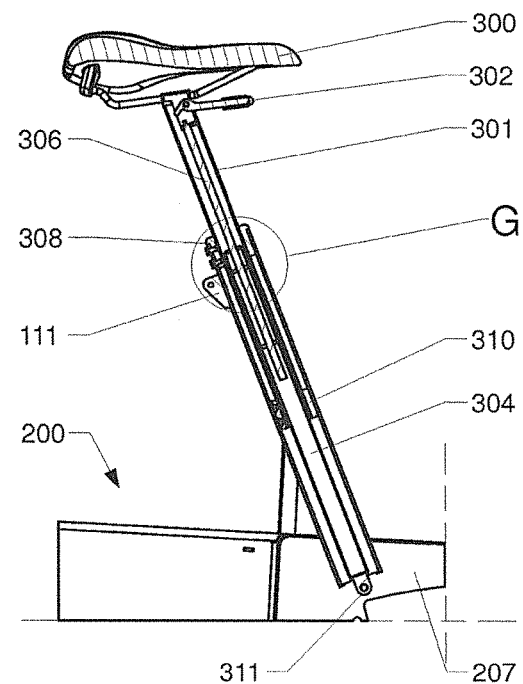
FIG. 20 shows section F-F of FIG. 19.
Figure 21:
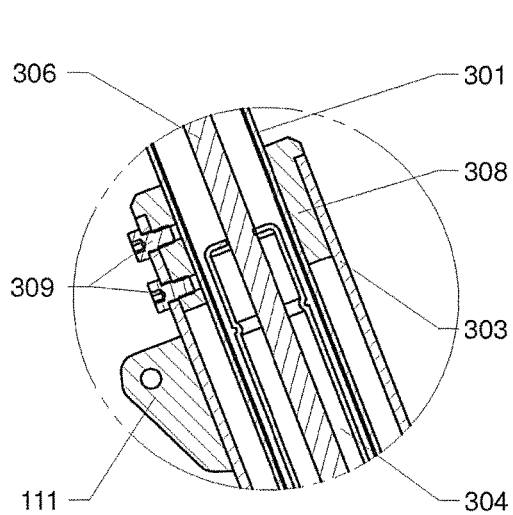
FIG. 21 shows detail G of FIG. 20.

FIG. 18 shows a possible embodiment of a saddle attachment 300 according to the invention. Such an embodiment comprises, on one hand, the saddle proper 312, a saddle stay 301, as well as an adjustment mechanism, which is essentially positioned in the saddle stay 301 and in the saddle tube 303, for adjusting the desired saddle height. This may be actuated by means of an adjustment lever 302 underneath the saddle. As shown in FIG. 20, such an adjustment mechanism may comprise a gas spring 304, which is provided, at its lower end with an anchor 311 in the frame structure 200, for example, on support structure 207 and is connected, at the other end, with the saddle stay 301 or directly to the saddle 312. In the embodiment of FIG. 20, the piston rod 306 of the gas spring 304 is connected to a support of saddle 312. In order to prevent a relative rotation between the saddle 312 and the rest of the bicycle 100, according to the invention it is envisaged that the saddle stay 301 does not have a circular cross-section. In the embodiments of FIGS. 18 to 21, the saddle stay 301 has a rectangular cross-section. In the area of the upper end of saddle tube 303, according to the invention, a sleeve 308 is provided as a guide for the saddle stay 301, which is provided with an inner cross-section corresponding to the outer cross-section of the saddle stay 301—therefore an essentially rectangular inner opening. Sleeve 308 is solidly connected to the saddle tube 303, for example by screwing 309. In addition, the saddle stay 301 may also be provided, in the area of its lower end, with its own outer guide sleeve 310, which guides the saddle stay 301 in the saddle tube 303 and also limits the maximum saddle height, for example.

Figure 22:
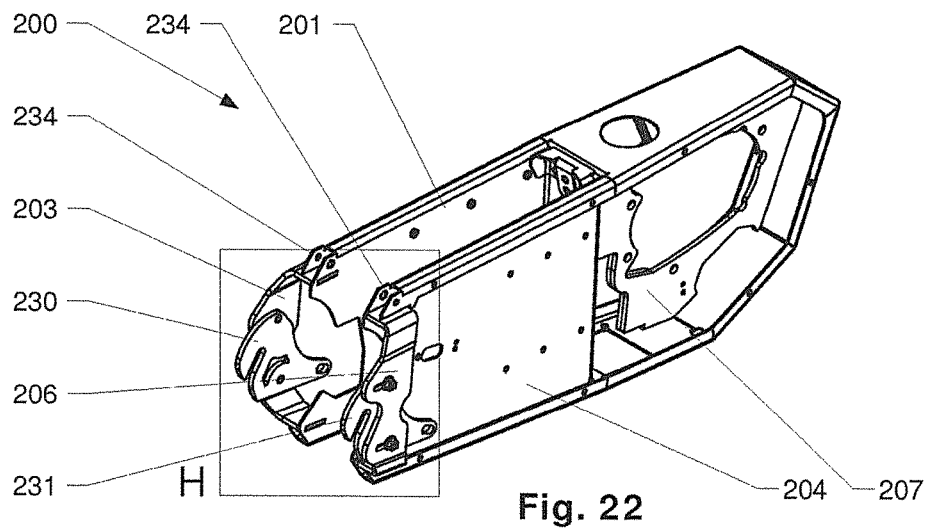
FIG. 22 shows a frame structure.
Figure 23A:
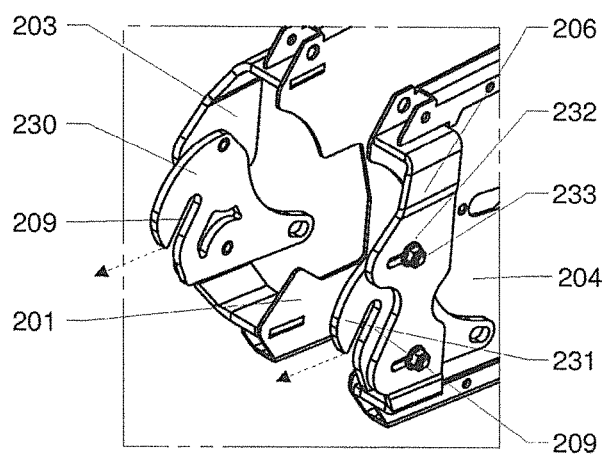
FIG. 23a shows detail H of FIG. 22, wherein the mounting elements are in a first position.
Figure 23B:
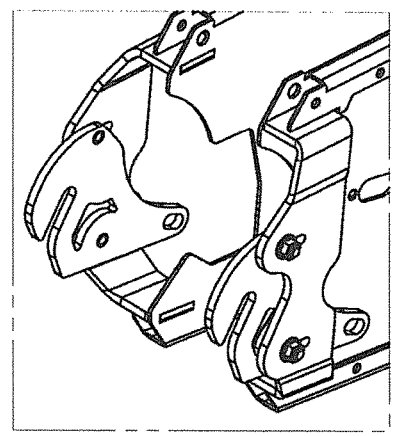
FIG. 23b shows detail H of FIG. 22, wherein the mounting elements are in a second position.

FIG. 22 shows a further frame structure 200 according to the invention, wherein the housing means for the rear wheel are provided by first and second brackets 203, 206 and first and second mounting elements 230, 231 arranged on the same. These are adjustable with respect to rockers 201, 204, as shown in the following FIGS. 23a and 23b. The support structure 207 of frame structure 200 shown comprises a plate, which is mechanically partially reinforced by a second plate overlaying the same. As schematically shown in FIG. 23a, by means of dotted arrows, the position of mounting elements 230, 231 with respect to brackets 203, 206 and also to rockers 201, 204 may be adjusted. To this end, the mounting elements 230, 231 are connected, by means of adjustment screws 233 which are supported inside oblong openings 232, to brackets 203, 206. On the adjustment screws 233 nuts are positioned, so that the mounting elements 230, 231 may be fixed in different positions with respect to brackets 203, 206 (or rockers 201, 204). An axle of a rear wheel (not shown), positioned in the drop-outs 209 may be positioned at different distances from the pedal bearing shaft (not shown) and therefore a drive chain or drive belt may be tensioned or loosened between the pedal bearing shaft and the rear wheel. In this way, a rear wheel may be easily mounted or replaced without the need for a chain or belt tensioning device. FIG. 23a shows frame structure, in which the mounting elements 230, 231 are in a first position, in which a drive belt would be loosened. FIG. 23b shows mounting elements 230, 231 in a second position, in which a drive belt would be in a tensioned position.

Figure 24:
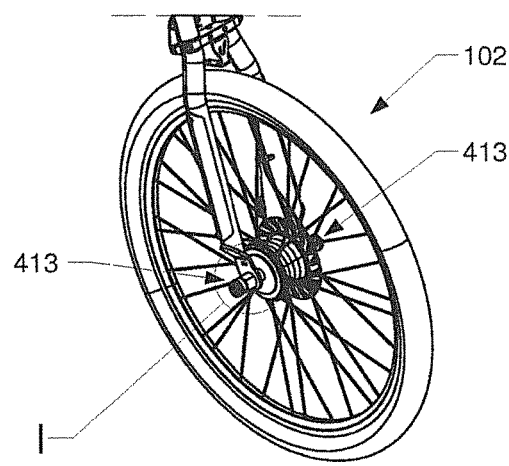
FIG. 24 shows contact elements in the area of the front wheel of a bicycle.
Figure 25:
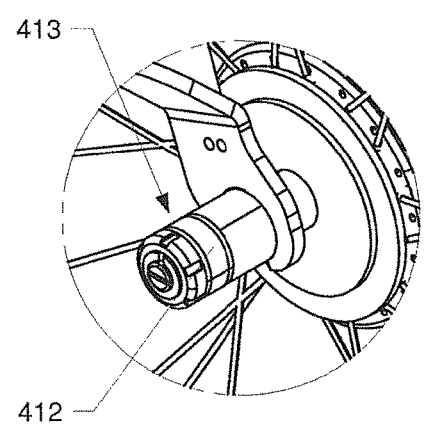
FIG. 25 shows detail I of FIG. 24.

FIGS. 24 and 25 show a detail of an embodiment of a bicycle, in which a docking element 413 composed of two parts is positioned in the area of the suspension of the front wheel 102. Both parts are positioned on both sides in the axial direction, with respect to wheel 102. The docking element 413 shown has a cylindrical, or pin-like, shape, whereby a particularly simple connection to a docking station (not shown) may be achieved. As shown in FIG. 25, such a docking element 413 may be provided with several axially separated areas, such as a contact pole 412 for electric contacting. Such an electric contact is obtained in the embodiment shown through sliding contacts. A second contact pole (not shown) is positioned on the other part of docking elements 413. According to the invention, though, two contact poles may be provided on the same part. The areas axially adjacent to the contact pole 412 are used, among other things, to perform a secure mechanical connection between the bicycle and a docking station.

The invention claimed is:

1. A bicycle (100) having a frame structure (200), comprising
    a. a swingarm structure (225) including a first substantially U-shaped sheet metal part (225) for holding a wheel (103), the first substantially U-shaped sheet metal part (225) including a first swingarm leg, a second swingarm leg and a swingarm shoulder, as well as
    b. a frame bridge consisting of a second substantially U-shaped sheet metal part (219), the second substantially U-shaped sheet metal part (219) including a first frame bridge leg, a second frame bridge leg and a frame bridge shoulder, wherein the first frame bridge leg end and the second frame bridge leg are mechanically connected to the swingarm shoulder and wherein the frame bridge and the swingarm shoulder radially delimit a drive box (213), wherein
    c. the first U-shaped sheet metal part (225) is bent substantially in a first bending plane (P) to form a first U-shape, and
    d. the second U-shaped sheet metal part (219) is bent in a second bending plane (Q) to form substantially a second U-shape, wherein
    e. the first bending plane (P) extends substantially perpendicular to the second bending plane (Q).

2. The bicycle (100) according to claim 1, wherein the frame bridge (219) comprises a supporting structure (207), which extends between both legs of the frame bridge (219) and operatively connects the same to each another.

3. The bicycle (100) according to claim 2, wherein the supporting structure (207) is provided for mounting a drive component.

4. The bicycle (100) according to claim 2, wherein the supporting structure (207) is provided with at least one cavity (208) for housing a drive component.

5. The bicycle (100) according to claim 1, wherein at least one edge (226) of the swingarm structure (225) and/or at least one edge (224) of the frame bridge (219) are at least partially bent inwardly and/or outwardly.

6. The bicycle (100) according to claim 1, wherein the frame bridge (219) is provided with at least one opening (220, 221, 220) for attaching further frame parts and/or a stand and/or for using as a cooling air inlet.

7. The bicycle (100) according to claim 1, wherein the first leg end and the second leg end of the swingarm structure (225) are provided each with a respective housing (203, 206) for supporting a wheel axle.

8. The bicycle (100) according to claim 7, wherein the housing (203, 206) is bracket-shaped.

9. The bicycle (100) according to claim 7, wherein the housing (203, 206) comprises drop-outs.

10. A stand (500) for a bicycle (100) with a frame structure (200) according to claim 1, with at least one folded position and at least one unfolded position and a locking mechanism, which fixes the stand (500) in at least one unfolded position against a folding back, and which allows an unlocking, wherein the locking mechanism is positioned inside the frame structure.

11. The stand (500) for a bicycle (100) according to claim 10, wherein the locking mechanism is provided with means for electromechanical unlocking (505).

12. The stand (500) for a bicycle (100) according to claim 10, wherein the stand is functionally coupled to a drive control (124) of bicycle (100).

13. The stand (500) for a bicycle (100) according to claim 10, wherein the unlocking is performed by means of RFID and/or a mechanical key and/or the input of a numerical code and/or by biometric identification.

14. A handlebar (112) for a bicycle (100) according to claim 1, comprising a first fork tube (409) and a second (410) fork tube, which is structurally separated from the first fork tube (409), and a first steering handle (414) and a second (415) steering handle, wherein the first fork tube (409) is structurally joined to the first steering handle (414) and the second fork tube (410) is structurally joined to the second steering handle (415).

15. The handlebar (112) for a bicycle (100) according to claim 14, wherein at least one electrical cable or Bowden cable is arranged inside the first fork tube (409) and/or the second fork tithe (410).

16. The handlebar (112) for a bicycle (100) according to claim 14, wherein the first fork tube (409) is provided with a first electric contact pole (411) and the second fork tube (410) is provided with a second contact pole (412).

17. The handlebar (112) for a bicycle (100) according to claim 14, wherein at least one fork tube (409, 410) is used as a mechanical docking means to a docking station.

18. A bicycle (100) having a frame structure (200), comprising
   a. swingarm structure (225) including a first substantially U shaped sheet metal part (225) for holding a wheel (103), as well as
   b. a frame bridge consisting of a second substantially U-shaped sheet metal part (219), wherein
   c. the first U-shaped sheet metal part (225) is bent substantially in a first bending plane (P) to form a first U-shape, and
   d. the second U-shaped sheet metal part (219) is bent in a second bending plane (Q) to form substantially a second U-shape, wherein
   e. the first bending plane (P) extends substantially perpendicular to the second bending plane (Q), and
   f. a stand (500) with at least one folded position and at least one unfolded position and a locking mechanism, which fixes the stand (500) in at least one unfolded position against a folding back, and which allows an unlocking, wherein the locking mechanism is positioned inside the frame structure and wherein the locking mechanism is provided with means for electromechanical unlocking (505).

19. A handlebar (112) for a bicycle (100) having a frame structure (200), comprising
   a. a swingarm structure (225) including a first substantially U shaped sheet metal part (225) for holding a wheel (103), as well as
   b. a frame bridge consisting of a second substantially U-shaped sheet metal part (219), wherein
   c. the first U-shaped sheet metal part (225) is bent substantially in a first bending plane (P) to form a first U-shape, and
   d. the second U-shaped sheet metal part (219) is bent in a second bending plane (Q) to form substantially a second U-shape, wherein
   e. the first bending plane (P) extends substantially perpendicular to the second bending plane (Q), and
   f. a handlebar (112) comprising a first fork tube (409) and a second (410) fork tube, which is structurally separated from the first fork tube (409), and a first steering handle (414) and a second (415) steering handle, wherein the first fork tube (409) is structurally joined to the first steering handle (414) and the second fork tube (410) is structurally joined to the second steering handle (415), wherein the first fork tube (409) is provided with a first electric contact pole (411) and the second fork tube (410) is provided with a second contact pole (412).

\* \* \* \* \*